No. 744,202. PATENTED NOV. 17, 1903.
F. W. JARVIS.
VALVE GEAR.
APPLICATION FILED JUNE 27, 1903.
NO MODEL. 9 SHEETS—SHEET 3.
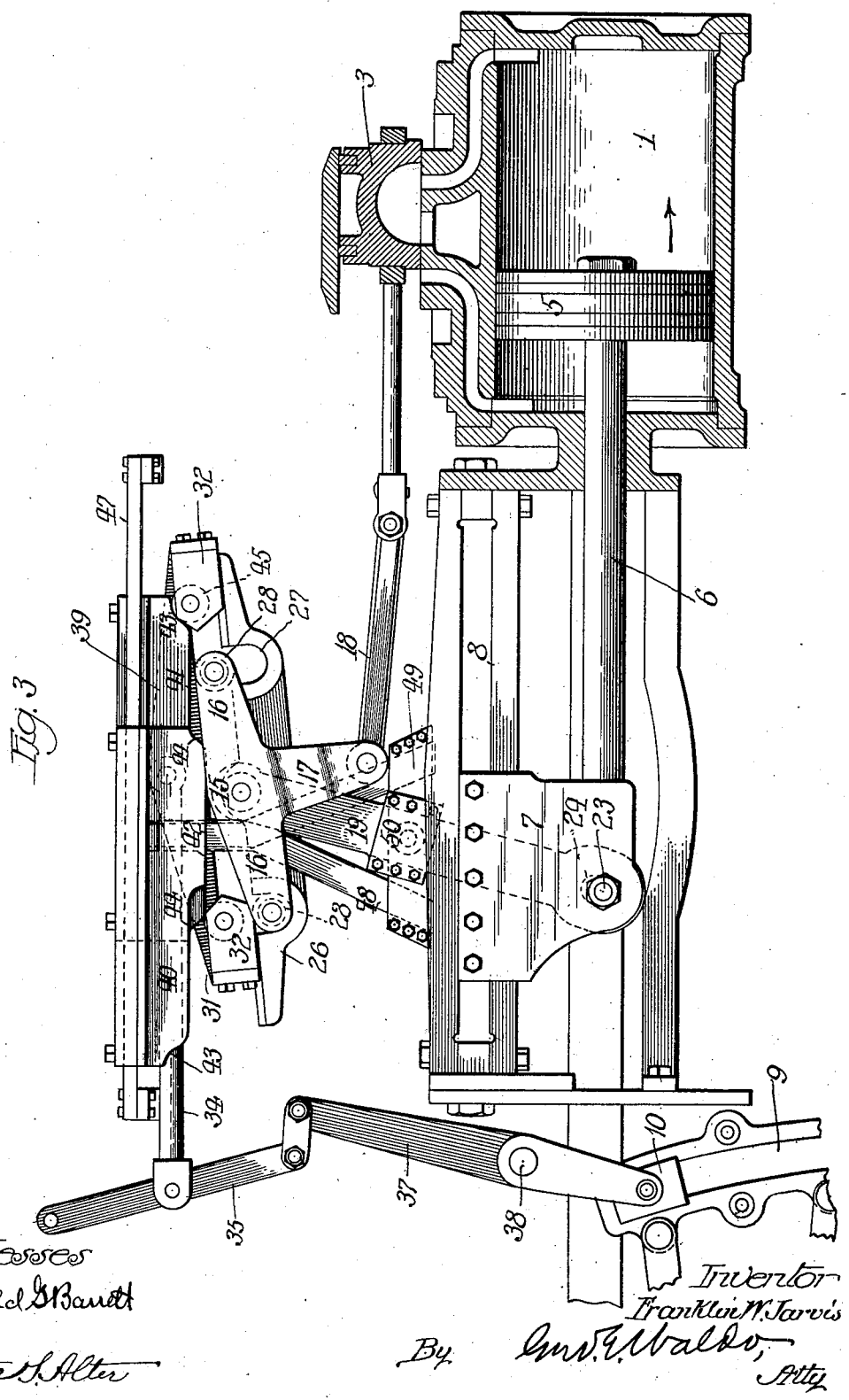

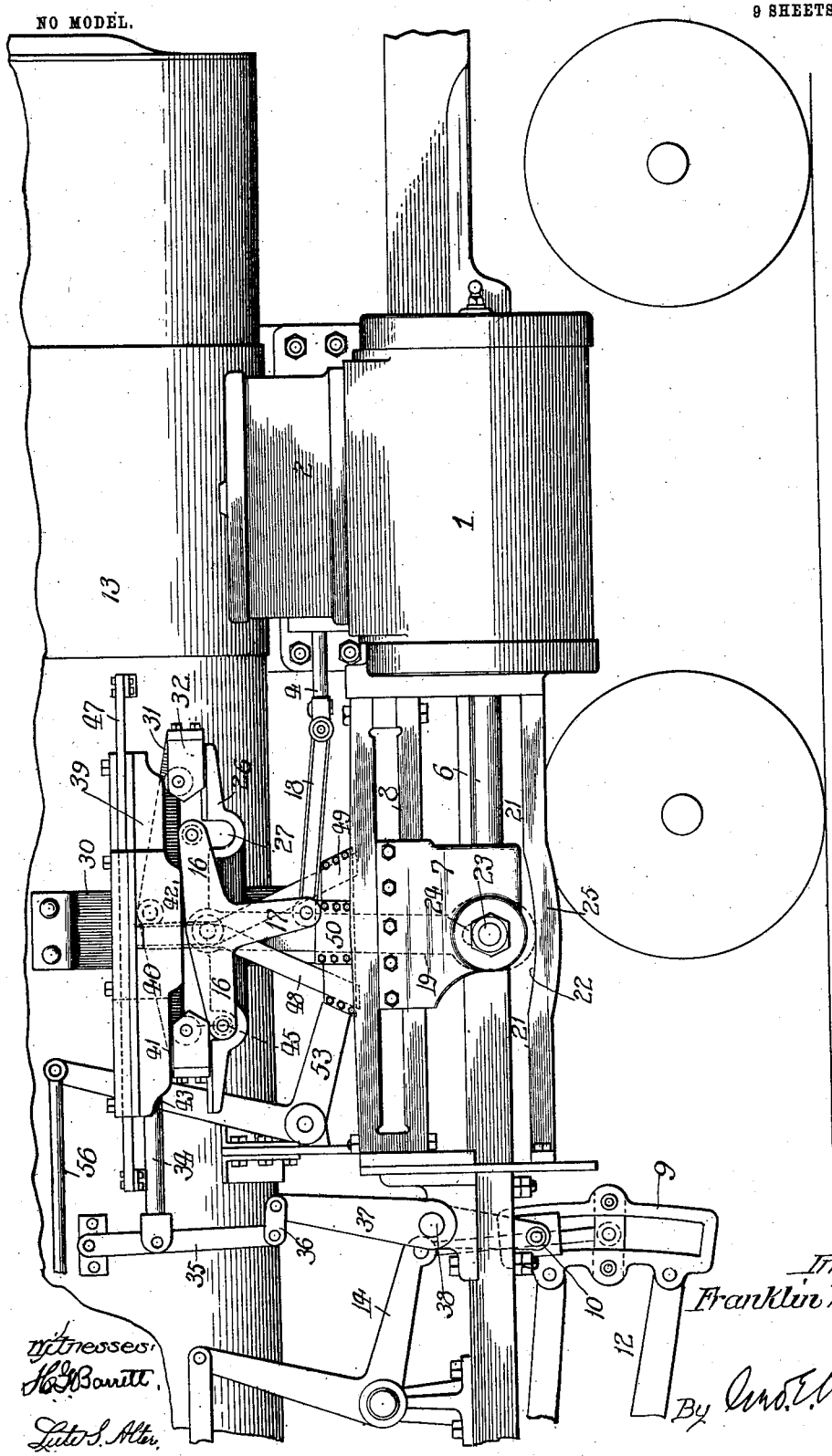

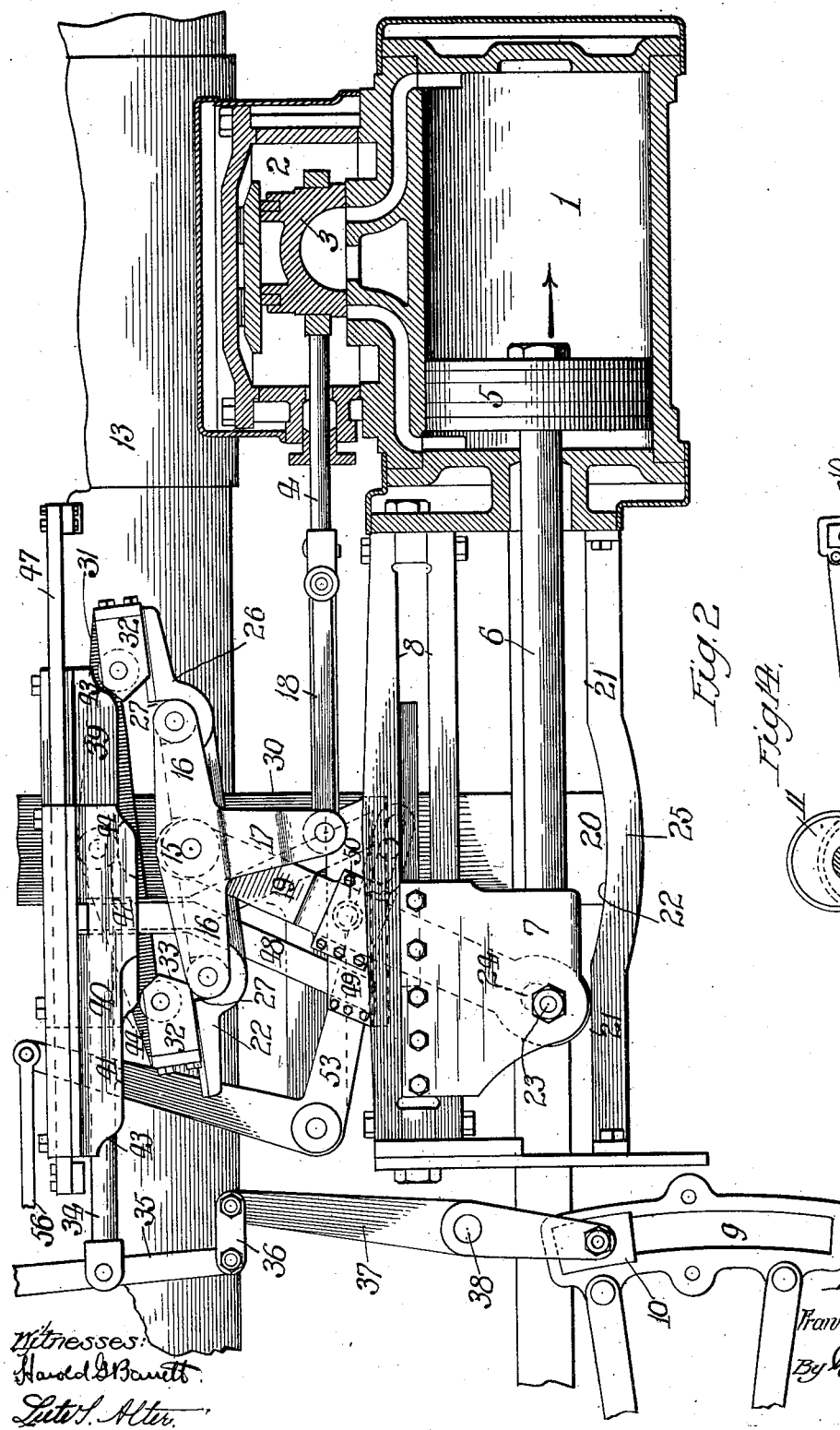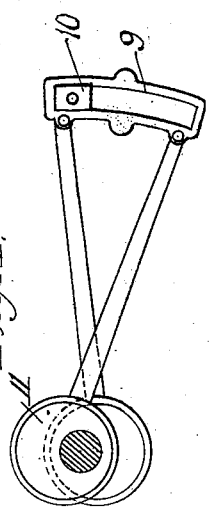

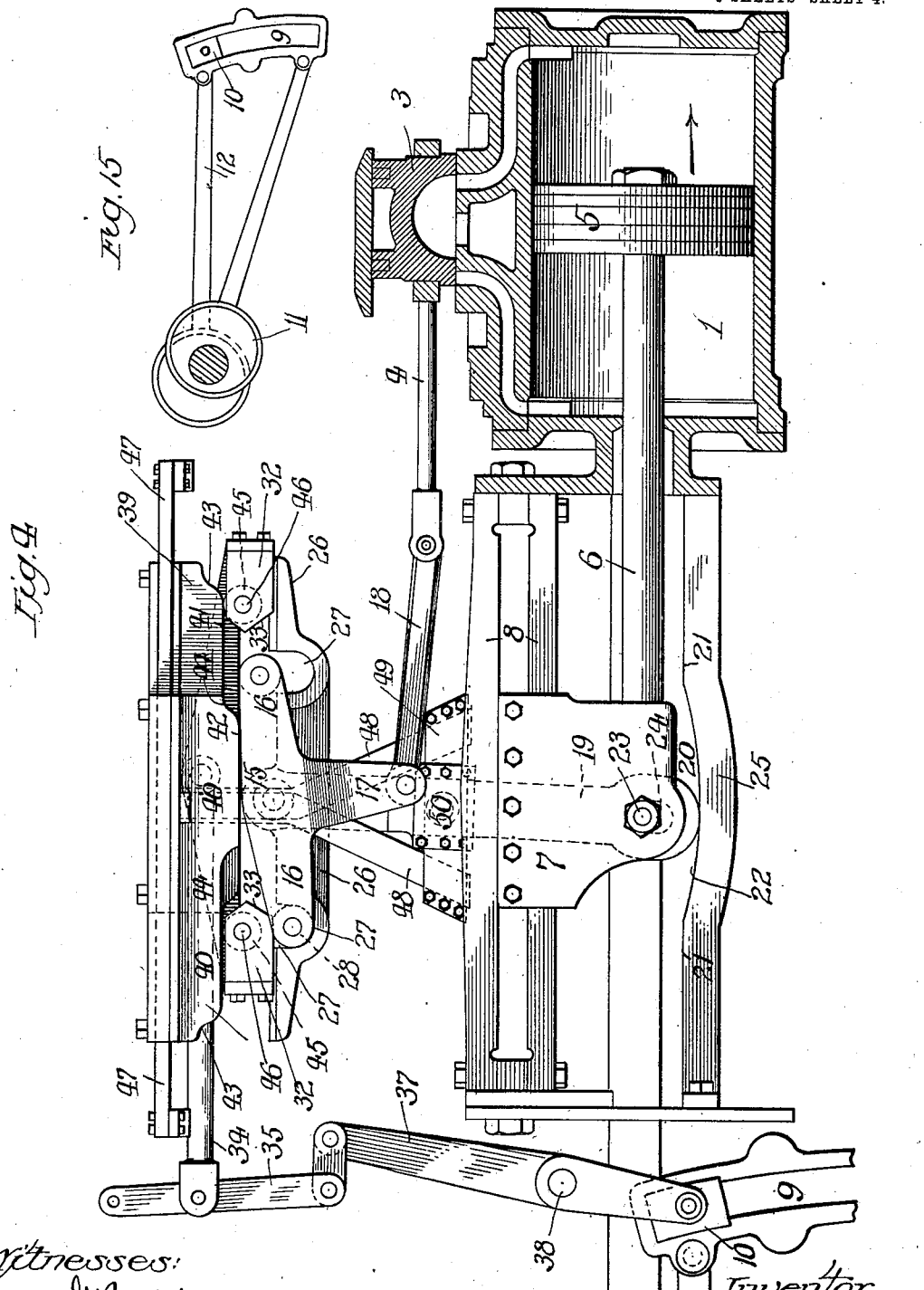

No. 744,202. PATENTED NOV. 17, 1903.
F. W. JARVIS.
VALVE GEAR.
APPLICATION FILED JUNE 27, 1903.
NO MODEL. 9 SHEETS—SHEET 5.
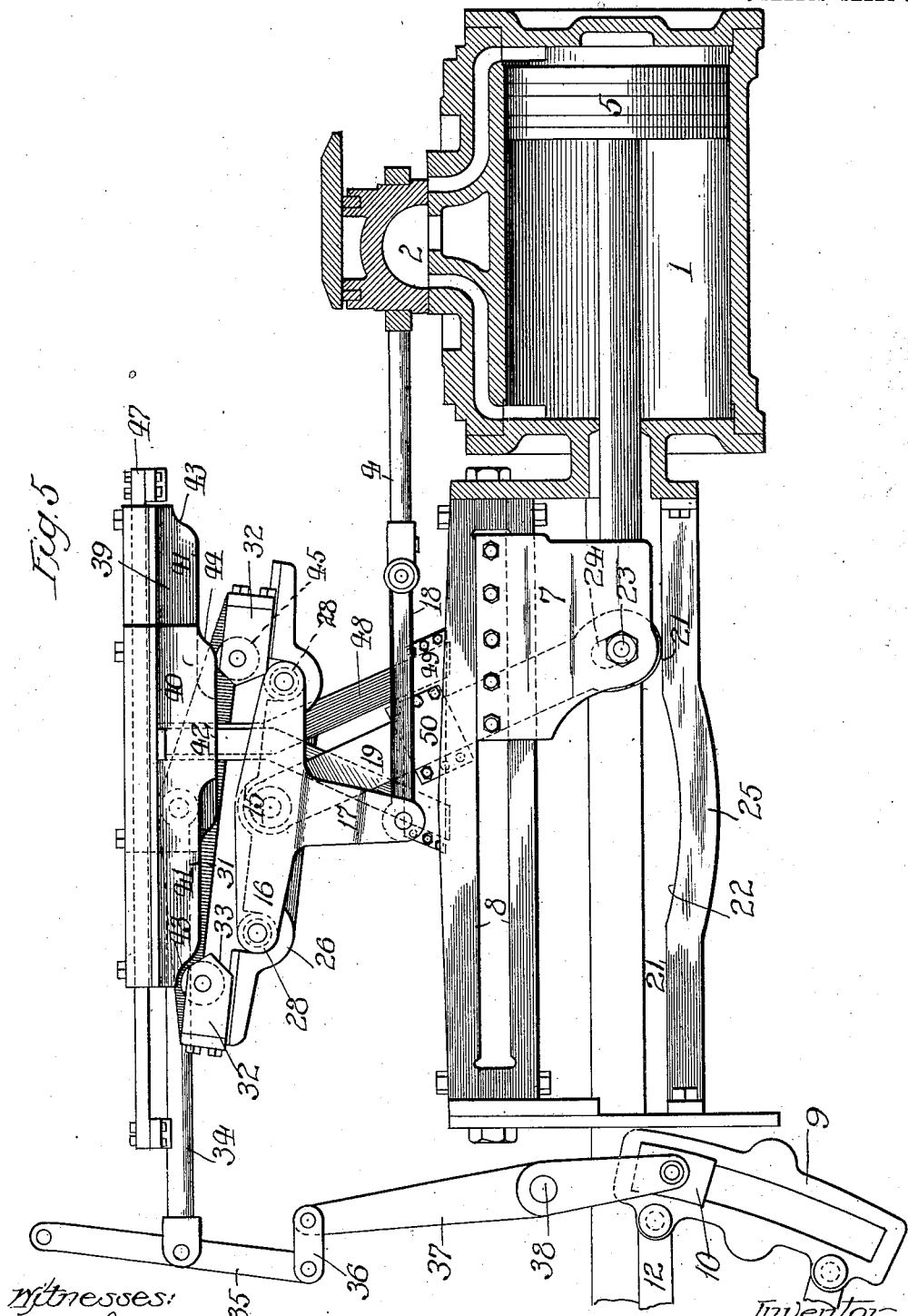

No. 744,202. PATENTED NOV. 17, 1903.
F. W. JARVIS.
VALVE GEAR.
APPLICATION FILED JUNE 27, 1903.
NO MODEL. 9 SHEETS—SHEET 6.
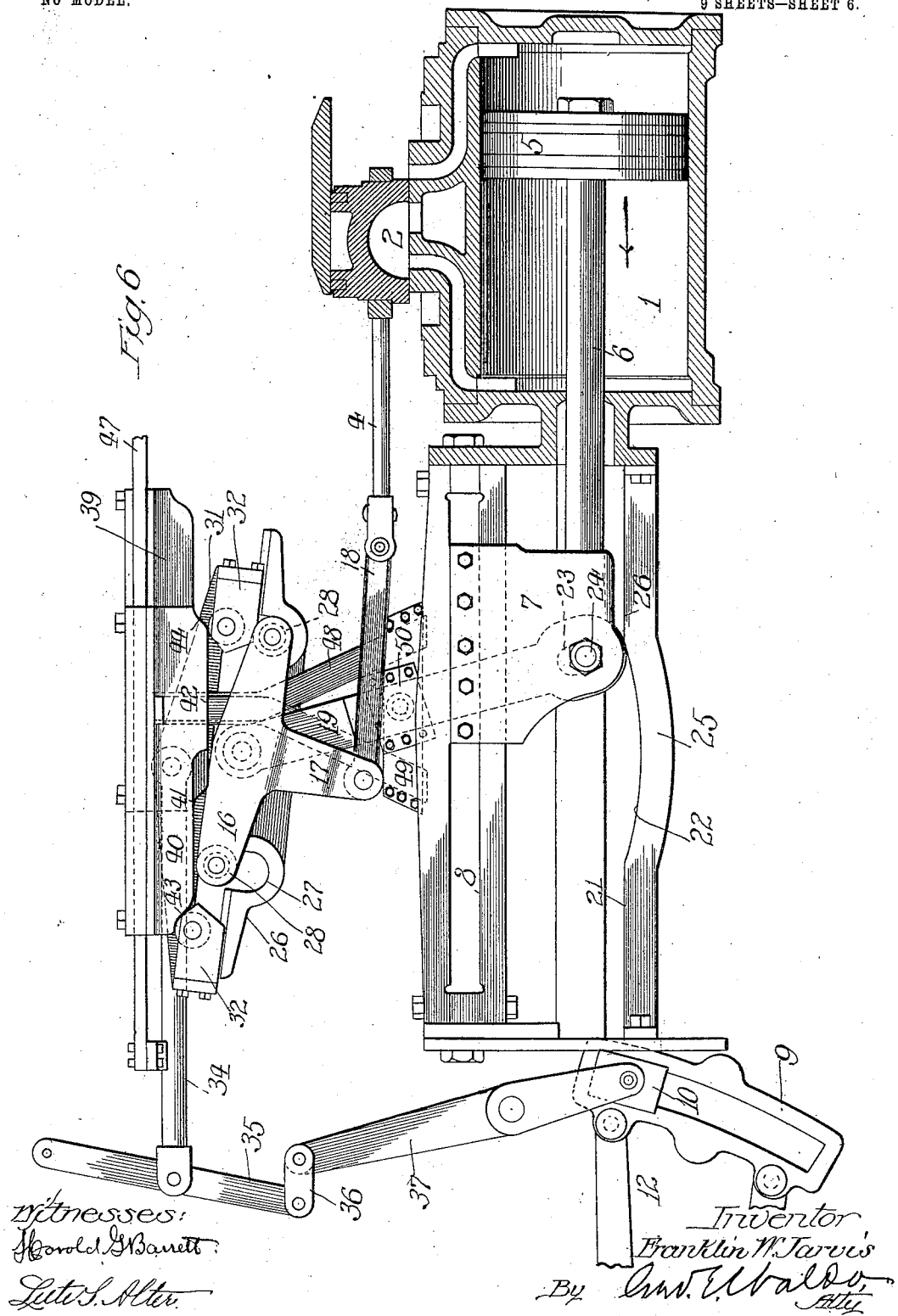
Witnesses:
Harold G. Barrett
Lete S. Alter
Inventor
Franklin W. Jarvis
By Geo. W. Waldo,
Atty.

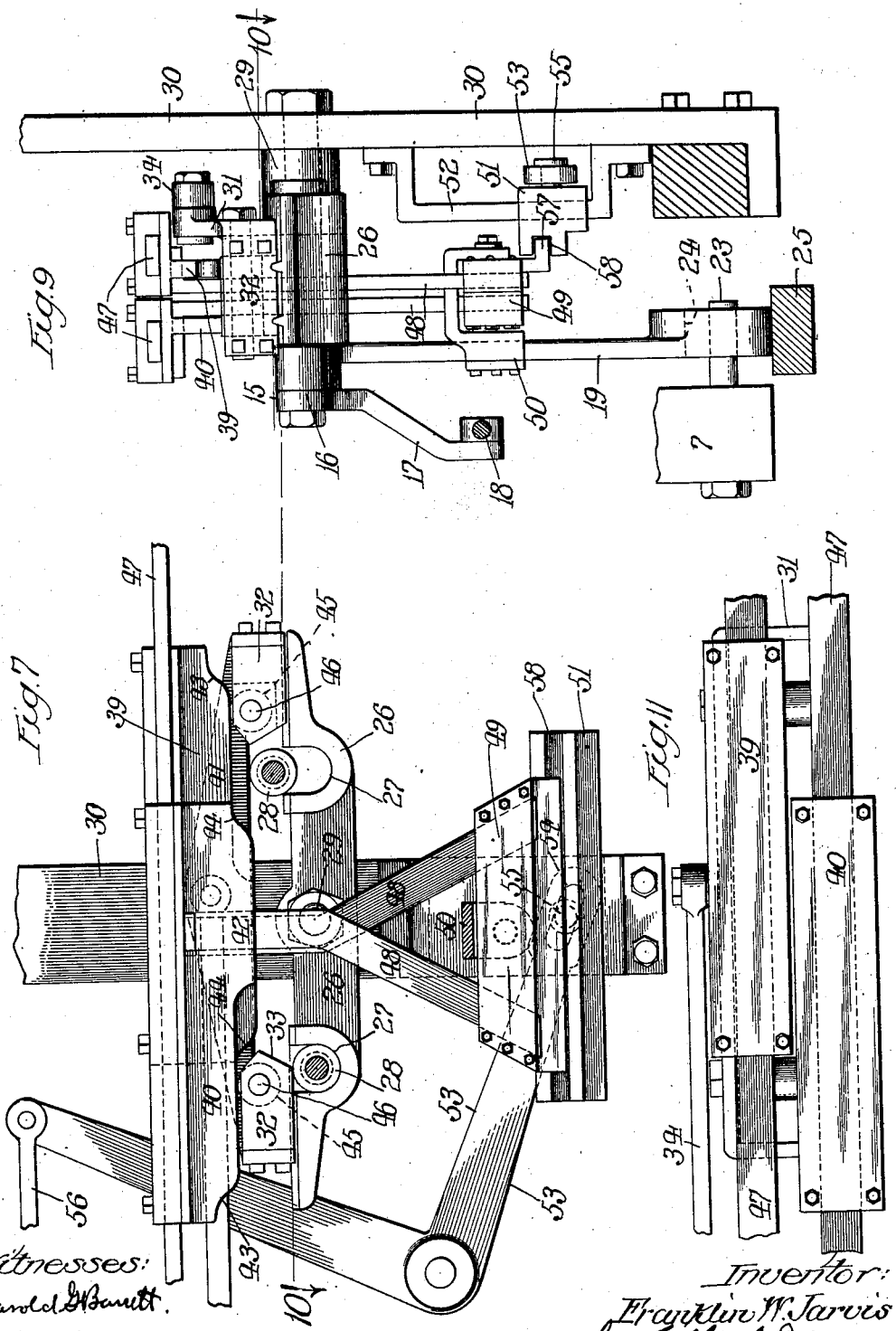

No. 744,202. PATENTED NOV. 17, 1903.
F. W. JARVIS.
VALVE GEAR.
APPLICATION FILED JUNE 27, 1903.
NO MODEL. 9 SHEETS—SHEET 8.
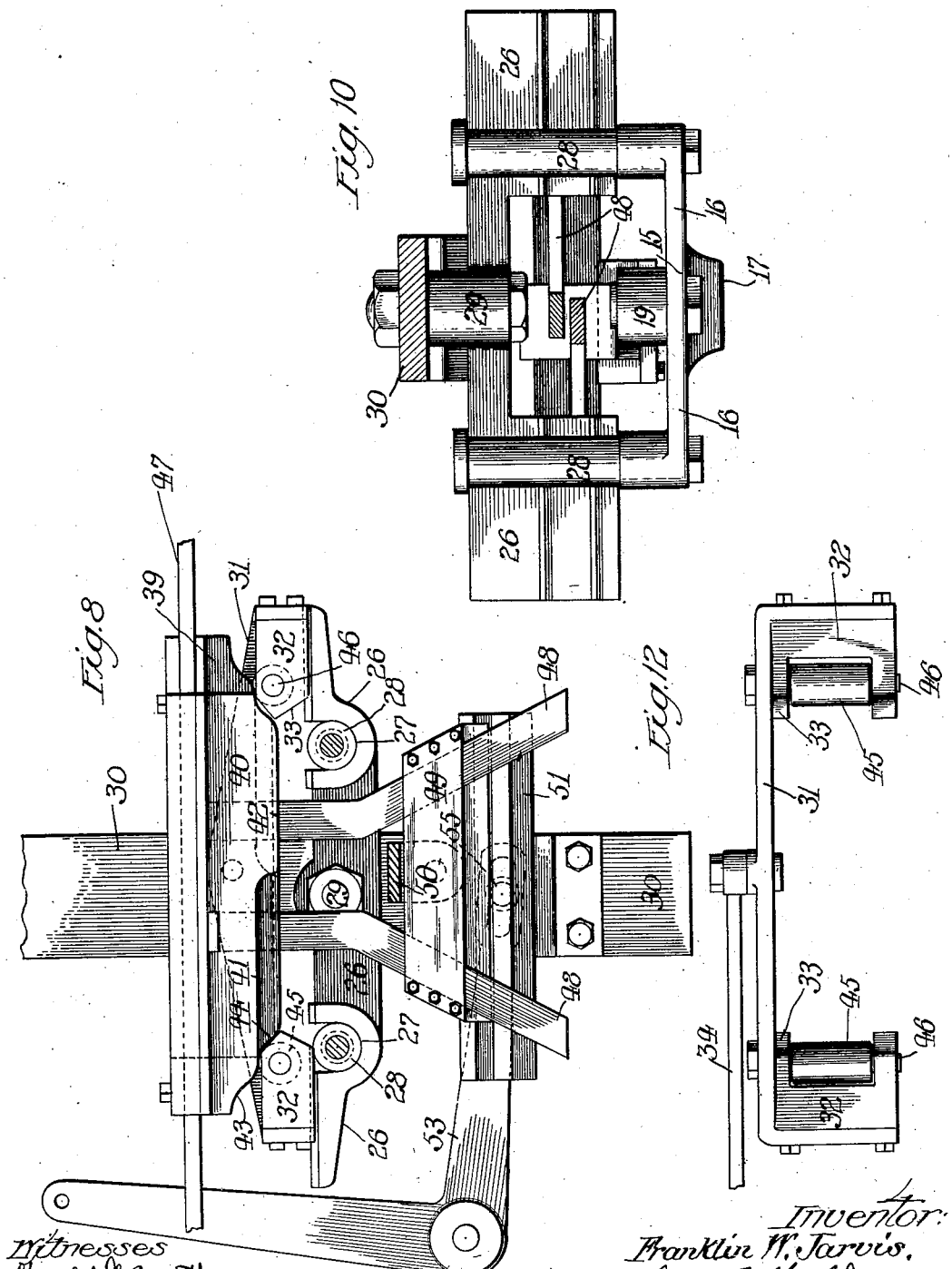

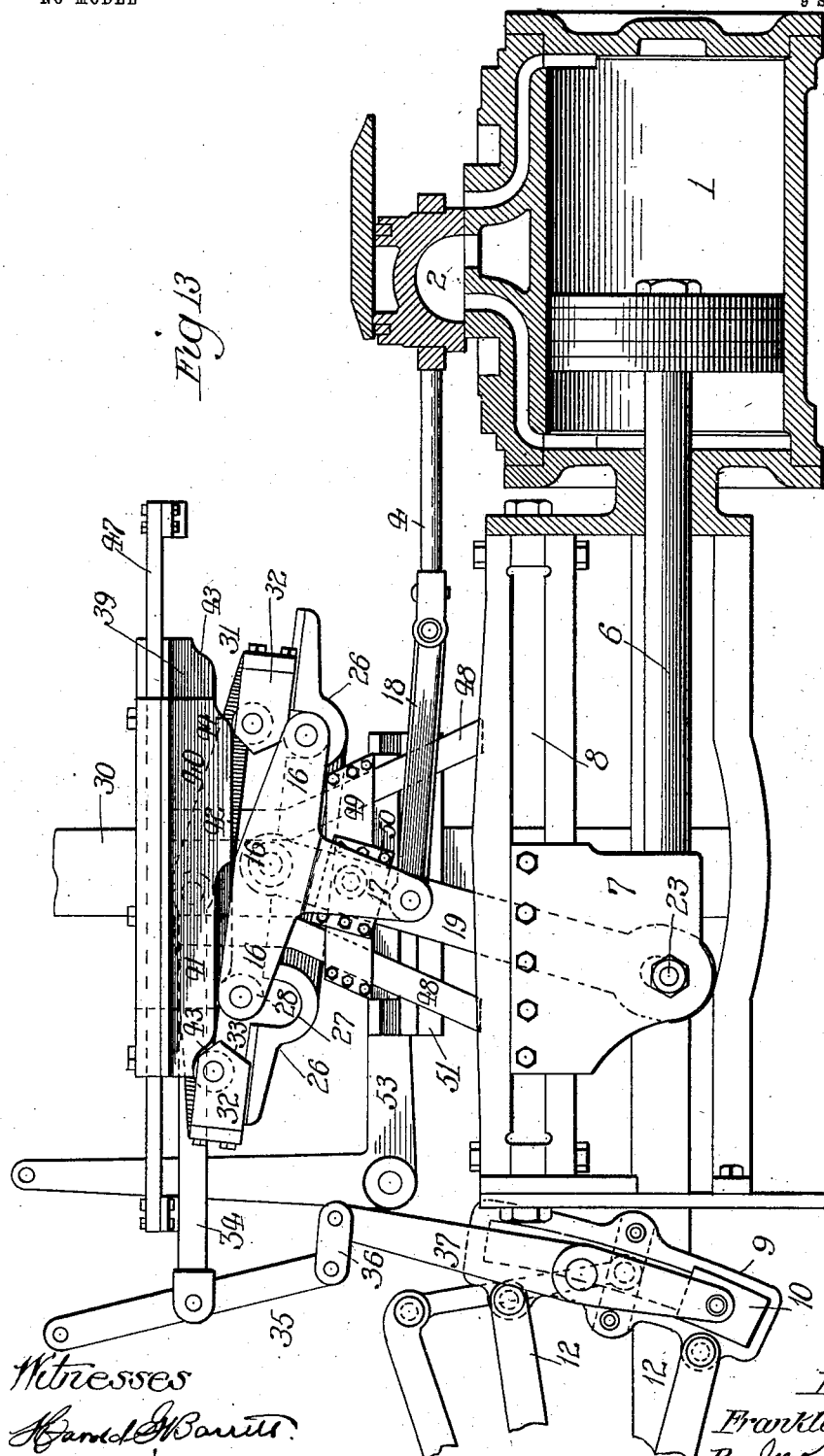

No. 744,202. Patented November 17, 1903.

UNITED STATES PATENT OFFICE.

FRANKLIN W. JARVIS, OF CHICAGO, ILLINOIS.

VALVE-GEAR.

SPECIFICATION forming part of Letters Patent No. 744,202, dated November 17, 1903.

Application filed June 27, 1903. Serial No. 163,313. (No model.)

*To all whom it may concern:*

Be it known that I, FRANKLIN W. JARVIS, a citizen of the United States, and a resident of Chicago, county of Cook, and State of Illinois, have invented certain new and useful Improvements in Valve-Gears, of which the following is a specification.

This invention relates to valve-gears, and relates particularly to reversible valve-gears, by means of which steam or other fluids under presure may be admitted to either end of a power-cylinder, as desired, to provide for running an engine in opposite directions.

The invention also relates to valve-gears of this type having a variable cut-off to provide for running the engine on greater or less expansion.

At the present time it is the almost universal practice to effect the reversal of the valve and to regulate the cut-off by means of a link-motion, the form of link in most common use being that known as the "Stephenson" link. The Stephenson link-motion is objectionable for various reasons, among which may be enumerated the following: It is impossible to operate the valve to develop the highest efficiency of the engine when running in opposite directions; the cut-off is regulated by varying the travel of the valve, resulting in only a partial opening of the admission-port when working on a short cut-off; the exhaust-port begins to close a considerable time before the piston reaches the end of its stroke, developing a back pressure in the cylinder, which materially reduces the power of the engine, and owing to the variation in the travel of the valve its seat wears unevenly, rendering it impossible to maintain a tight joint between the valve and its seat, thus causing leakage at the ports.

Among the objects of the invention are to overcome the above objectionable features by providing a valve-gear by which a variable cut-off can be secured with a full opening of the admission-port up to the point of cut-off and a full opening of the exhaust-port through substantially the entire stroke of the engine regardless of the cut-off, which will impart a travel of uniform length to the valve, thus wearing the valve-seat uniformly and maintaining a tight joint almost indefinitely between the valve and its seat and which will operate the same in both directions, so that a maximum efficiency can be obtained with the engine running in either direction.

To effect the objects of the invention, my improved valve-gear consists of the various features, combinations of features, and details of construction hereinafter described and claimed.

In the accompanying drawings a valve-gear of my invention is fully illustrated, said valve-gear being shown as applied to a steam-locomotive.

Figure 1 is a partial side view of a steam-locomotive equipped with my improved valve-gear. Fig. 2 is an enlarged side view of my improved valve-gear, showing the adjustment and relative positions of the parts when the locomotive is running forward and the piston is at the rearward limit of its stroke and the engine is operating on a cut-off of about one-fourth of its stroke. Fig. 3 is a view similar to Fig. 2, showing the relative positions of the parts just at the beginning of the cut-off. Fig. 4 is a view similar to Figs. 2 and 3, showing the relative positions of parts after the cut-off, the admission-port being closed and the exhaust-port being still fully open. Fig. 5 is a view similar to Figs. 2 to 4, showing the relative positions of the parts when the piston is at the forward limit of its stroke. Fig. 6 is a view similar to Figs. 2 to 5, showing the relative positions of the parts just before the cut-off on the rearward stroke. Fig. 7 is a side view particularly illustrating the means for varying and regulating the cut-off, the parts being in position to effect a short cut-off. Fig. 8 is a view similar to Fig. 7, the parts being in position to admit steam during practically the entire stroke of the piston. Fig. 9 is an enlarged end view of my improved valve-gear. Fig. 10 is a plan section on the line 10 10 of Fig. 9. Figs. 11 and 12 are detail views. Fig. 13 is a view similar to Fig. 3, showing the relative positions of parts to reverse the engine, so that the locomotive will run backward. Figs. 14 and 15 are diagrammatic views showing the positions of the eccentrics and link when the piston is at the rear end and middle of its stroke, respectively.

Referring now to the drawings, 1 designates the steam-cylinder of a locomotive; 2, the steam-chest; 3, the valve; 4, the valve-stem; 5, the piston; 6, the piston-rod; 7, the crosshead; 8, the cross-head guides; 9, the link; 10, the link-block; 11, the eccentrics which actuate the link; 12, the rods which connect the link with the eccentric-straps; 13, the boiler, and 14 the lever operated from the cab for raising and lowering the link. All of the foregoing parts may be of any usual or approved construction and will be clearly understood without a detailed description thereof.

I will now describe the construction of my improved valve-gear.

The valve 3 is actuated directly by means of a T-lever 15, comprising lateral arms 16 and a downwardly-extending arm 17, which is connected to the valve-stem 4 by means of a link 18. The T-lever is pivoted to the upper end of a rod or bar 19, the lower end of which slides upon a cam 20, comprising end sections 21, which are parallel with the crosshead guides, and an intermediate circular section 22, concentric with the pivotal point of the T-lever 15. Reciprocating movement is imparted to the lower end of the rod or bar 19 by means of a stud 23, secured in the crosshead 7, preferably in line with the piston-rod of the engine, which engages a slot 24, formed in the lower end of said rod or bar 19, the relation being such that the pivot-pin 23 will strike the lower end of the slot 24 just at the time that the lower end of the rod or bar 19, resting on the cam 20 and moving therealong under the influence of the pin 23, passes from the circular section 22 of said cam onto a section 21 thereof, and the relation is such also that the lower end of said rod or bar 19 will pass on to the sections 21 of the cam 20 before the piston reaches the end of its stroke in either direction—say a distance of one-fourth of its entire stroke. With this construction it is obvious that, as the rod or bar 19 moves along the sections 21 of the cam 20 to the end of its stroke in either direction it will operate to draw the upper end of said rod or bar 19, to which the T-lever 15 is pivoted, downward, and also that as the lower end of said rod or bar moves along the portions 21 of the cam 20 toward the circular portion 22 thereof it will operate to raise said rod or bar 19 bodily, and thus raise the pivotal point of said T-lever 15.

As shown, the cam 20 is formed on a bar 25, secured in fixed position to the cross-head frame.

Pivoted upon a fixed support adjacent to the upper end of the rod or bar 19 is a member 26, formed in which are transverse grooves 27, which are adapted to be engaged by lateral projections 28 on the T-lever 15. As shown, the member 26 is pivotally supported upon a stud 29, rigidly secured in a bar 30, the upper end of which is attached to the shell of the boiler and the lower end of which is secured to the engine-frame or other support.

Supported in contact with the member 26 and movable lengthwise therealong is a slide 31, on which are blocks 32, between which is an open space.

Reciprocating movement is imparted to the slide 31 by suitable means, the relation and adjustment of parts being such that normally when the piston is at either end of its stroke the block 32 at the corresponding end of the slide 31 will have moved into position to close the corresponding groove 27, the groove 27 at the opposite end of said slide being open and the space above the same unobstructed. As shown, also, the inner surface of the blocks 32 are outwardly and downwardly inclined, as shown at 33, thus forming cam-surfaces adapted to force the projections 28 on the T-lever 15 into the grooves 27 whenever the slide 31 is moved, so that said cam-surfaces 33 strike said projections 28, as in reversing the engine.

As shown, desired reciprocating movement is imparted to the slide 31 by means of a suitable connection with the link 9, comprising a rod 34, to one end of which the slide 31 is pivotally connected, preferably eccentrically to the pivotal point of the member 26, the opposite end of said rod 34 being connected to a lever 35 at a point between its ends, said lever being pivoted at one end and its free end being connected, by means of a link 36, to one end of a lever 37, the opposite end of which is connected to the link-block 10, said lever 37 being pivoted between its ends to a fixed rod or stud 38. The relation is such, also, that when the piston is at the ends of its stroke the eccentrics controlling the movement of the link 9 will be in positions about midway between their points of greatest throw.

Supported above the slide 31 so as to be freely movable in a direction parallel with the movement of the cross-head are slides 39 and 40, formed on the lower sides of which are cam-surfaces comprising straight sections 41 and 42 and inclined sections 43 and 44, adapted to engage rigid portions of the slide 31. As shown, said cam-surfaces engage antifriction-rollers 45, mounted on studs 46, secured in said slide 31. The relation of said cam-surfaces is such that when the straight sections 41 thereof are in contact with the rollers 45 the slide 31 and the member 26 will be parallel with the cross-head guides and the inclined sections 43 and 44 operating to impart pivotal movement to said slide 31, and thus to the member 26, the distances between the inclined sections 43 and 44 of said cam-surfaces being approximately equal to the distance between said rollers 45. Thus when a roller 45 runs into engagement with a cam-section 43 the other roller 45 will pass out of engagement with the cam-section 44 on the same cam-slide, and vice versa, thus providing for desired pivotal movement of the member 26 under the influence of said cams. Owing to the fact that the pivotal point of the slide 31 is eccentric to the pivotal point of the member 26, it is obvious that pivotal movement of said slide 31 and said member 26 about their respective pivotal points will impart a slight movement to said slide lengthwise of said member, the amount of said lengthwise movement depending upon the distance between the pivotal points of said slide and support and their angular movement.

As shown, the cam-slides 39 and 40 are supported upon guide-rods 47, secured in fixed position, said cam-slides being provided with suitable bearings which engage said rods. Said slides will thus be movable along said rods as guides in the desired manner.

With the described construction it is obvious that the slide 31 and cam-slides 39 and 40 will operate to prevent pivotal movement of the member 26, excepting under the influence of the cam-slides 39 and 40. Thus when either of the projections 28 on the T-lever 15 is locked in its groove by means of a block 32, in the manner heretofore described, it is obvious that said projection will form a pivot about which said T-lever 15 will be movable and that vertical movement of said T-lever 15, under the influence of the rod or bar 19, will operate to impart pivotal movement to said T-lever 15 about said fixed projection 28, which in turn will operate to impart movement to the valve 3. It is also obvious that when either of the projections 28 is locked in its groove 27 pivotal movement of the member 26, under the influence of the cam-slides 39 and 40 and the slide 31, will also operate to impart pivotal movement to the T-lever 15 and will likewise impart movement to the valve 3. Movement in the same direction as the piston is imparted to the cam-slides 39 and 40 by suitable means. As shown, desired movement is imparted to said cam-slides 39 and 40 by means of suitable connection with the cross-head 7, comprising plates or bars 48, rigidly secured thereto, the lower ends of which are fitted to slide-bearings in a head or frame 49, pivotally connected to the rod or bar 19. As shown, also, the lower ends of the bars or plates 48 are inclined relatively to each other, and the point of pivotal attachment of the head or frame 49 is adapted to be raised or lowered by suitable mechanism, which will operate in an obvious manner to move the cam-slides 39 and 40 inwardly or outwardly relatively to each other. As shown, also, the relation is such that when the rod or bar 19 is at one limit of its movement it will be parallel with the inclined lower end of one of the plates 48 and when at the other limit of its movement will be parallel with the inclined lower end of the other of said plates. As shown, also, the head or frame 49 is pivoted to a slide 50, which is longitudinally movable on the rod or bar 19, and the head or frame 49 is adapted to be raised and lowered by means of suitable connection with a slide 51, which is vertically movable on a fixed guide 52 and is adapted to be raised and lowered by means of a bell-lever 53, formed in the free end of which is a slot 54, which engages a pin or stud 55, secured in the slide 51, the opposite end of said bell-lever being connected, by means of a rod 56, with a suitable hand-lever in the engine-can, whereby pivotal movement as desired may be imparted to said bell-lever. As shown, also, the head or frame 49 is provided with a flange 57, which engages a groove 58, formed in said slide 51, said flange 57 being of sufficient length to maintain the head or frame 49 parallel with the cross-head guides.

With the described construction it is obvious that raising or lowering the head or frame 49 will operate to move the slide-cams 39 and 40 inwardly or outwardly relatively to each other in the desired manner. Owing to the fact that the lower ends of the plates or bars 48 are parallel with the rod or bar 19 when at the limit of its movement, it is obvious that the limit of movement of said cam-slides in one direction will always be the same, regardless of the vertical adjustment of the head or frame 49. The limits of movement of said cam-sections 44 outwardly will thus always be the same, the limits of movement inwardly of said cam-sections varying as the head or frame 49 is raised or lowered. With this construction it is also obvious that the inward limit of travel of the cam-sections 43 will always be the same, while their outward limits will vary in the same manner as the inward limits of the cam-sections 44. Thus engagement of the cam-sections 43 with the rollers 45 on the slide 31 may be regulated to occur at different points between the beginning and the end of the piston-stroke.

Having thus described the construction of my improved valve-gear, I will next describe its operation, beginning with the parts in the position shown in Fig. 2 of the drawings, in which the engine is running ahead and in which the piston is at the rearward limit of its movement. In this position the pivotal point of the T-lever 15 is in its lowest position, in which position it coincides with the pivot of the member 26, and the projections 28 on said T-lever 15 are fully seated in their respective grooves 27, the rearward block 32 being sufficiently advanced to lock the rearward projection 28 in its groove 27, and the rearward roller 45 having passed under the rearward cam-section 44 and resting in contact with the rearward end of the cam-section 42, thus operating to move the member 26 pivotally into the position shown, the position of the valve corresponding to this position of the actuating-lever, as shown, being such that the port to the rear end of the cylinder will be slightly opened, giving a desired lead, and the port to the front end of the cylinder will be fully opened to the exhaust. As the piston begins its forward movement the rod or bar 19, acting on the rear straight section 21 of the cam 20, will operate to raise the pivotal point of the T-lever 15, and the rear projection 28 of said T-lever being locked in its groove by the rear block 32 will impart pivotal movement to said T-lever 15 in a direction to uncover the port to the rear end of the cylinder, the relation being such that said rear port will be fully opened when the lower end of the rod or bar 19 passes from the said section 21 on to the curved section 22 of said cam 20. In Fig. 3 of the drawings I have shown the relative positions of parts for this position of the valve. As the piston continues to advance the front cam-section 43 will strike the front roller 45 and will pass over the same just as the rear roller 45 passes out from under the rear cam-section 44, thereby imparting pivotal movement to the member 26 to bring it in a position parallel with the cross-head guides, as shown in Fig. 4, which will operate in an obvious manner to impart pivotal movement to the T-lever 15 in a direction to close the rear cylinder-port, and the relation is such that said valve will be moved sufficiently to completely close said port, leaving the port to the front end of the piston fully open to the exhaust. It is thus obvious that the cam-sections 43, acting on the rollers 45 of the slide 31, control the cut-off of the engine and that by raising and lowering the head or frame 49, so that they will strike and ride over said rollers 45 sooner or later relative to the beginning of the stroke, the cut-off may be varied as desired and any desired expansion obtained. It is obvious that no further movement of the valve 3 will take place until the lower end of the rod or bar 19 passes on to the front straight section 21 of the cam 20 or until the front cam-section 44 strikes the front roller 45, the relation being preferably such that the lower end of said rod or bar 19 will pass on to said front straight cam-section 21 at substantially the same time that the front cam-section 44 strikes the front roller 45. It is obvious, as appears from Fig. 5, that both of these agencies will tend to impart movement to the valve in the same direction—to wit, in a direction to open the port to the front end of the cylinder for the admission of steam and to open the port to the rear end of the cylinder to the exhaust, their positions being exactly reversed from those shown in Fig. 2. In the meantime the slide 31, moving under the influence of the link 9 and the pivotal movement of the slide 31 and member 26, has come into position to lock the forward projection 28 into its groove 27 and to release the rearward projection 28, so that the same may rise relatively to its groove as the piston starts back for the purpose of fully opening the valve-ports, the front port for the admission of steam and the rear port to the exhaust.

As shown in Figs. 2, 3, 4, and 5, the engine is working on its greatest expansion—that is, with its shortest cut-off. When it is desired to increase the cut-off, this may be effected by raising the head or frame 49 in the manner described. When the head or frame 49 is fully raised, as shown in Fig. 8, the front and rear cam-sections 43 and 44 are substantially continuous with each other, and in this position steam will be admitted to the cylinder during substantially the entire stroke of the piston.

The engine may be reversed by raising the link 11, so that the link-block 10 will engage the same in line with the rod 12, connected to the lower end thereof. With the valve-gear set so that the engine will run ahead it is obvious that raising the link 9 will operate to move the slide 31, so as to lock the free projection 28 and release the locked projection, and the member 26 and the slide 31 being in inclined position that movement of said slide 31 relatively to the cam-slides 39 and 40 will operate to move the member 26 into its oppositely-inclined position.

In reversing the engine the head or frame 49 should always be raised, so that steam will be admitted to the cylinder during the full stroke, as otherwise the movement of the valve by raising or lowering the link might not be sufficient to open the port for the admission of steam to reverse the engine.

I claim as my invention—

1. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, and means to impart oscillatory movement to said pivotally-movable member, said means comprising cam-slides, guides on which said slides are movable, and means to impart reciprocating movement to said cam-slides, substantially as described.

2. In a valve-gear, the combination with the valve, of a pivoted T-lever, connection between said T-lever and the valve, means controlled by the movement of the piston to raise and lower the pivotal point of said T-lever as the piston begins and ends its stroke, a pivotally-movable member, means to alternately lock said T-lever to said pivotally-movable member at opposite sides of its point of pivotal support and means to impart oscillatory movement to said pivotally-movable member, said means comprising cam-slides, guides on which said slides are movable, and means to impart reciprocating movement to said cam-slides, substantially as described.

3. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, and means to impart oscillatory movement to said pivotally-movable member, and means comprising cam-slides, guides on which said cam-slides are movable, and connection between said cam-slides and the engine-piston, whereby movement of said piston will impart movement to said cam-slides in the same direction, substantially as described.

4. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, and means to impart step-by-step oscillatory movement to said pivotally-movable member, said means comprising cam-slides, guides on which said cam-slides are movable, and means to impart reciprocating movement to said slides, substantially as described.

5. In a valve-gear, the combination with the valve, of a pivoted T-lever, connection between said T-lever and the valve, means for raising and lowering the pivotal point of said T-lever as the piston begins and ends its stroke, a pivotally-movable member, means to alternately lock said T-lever to said pivotally-movable member at opposite sides of its point of pivotal support, means to impart step-by-step oscillatory movement to said pivotally-movable member, said means comprising cam-slides, guides on which said slides are movable, means to impart reciprocating movement to said slides and means to vary the times of pivotal actuation of said pivotally-movable member by the cut-off cam, substantially as described.

6. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable, means to impart reciprocating movement to said slides, and means to vary the longitudinal adjustment of said cam-slides relatively to each other, substantially as described.

7. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, and means to impart oscillatory movement to said pivotally-movable member, said means comprising cam-slides, guides on which said cam-slides are movable, and means to impart reciprocating movement to said slides, and manually-controlled means to vary the longitudinal adjustment of said cam-slides relatively to each other, substantially as described.

8. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable and means to impart reciprocating movement to said cam-slides, and means to vary the longitudinal adjustment of said cam-slides relatively to each other, the relation of parts being such that travel of each of said cam-slides in one direction will always be the same, substantially as described.

9. In a valve-gear, the combination with the valve, of a pivoted T-lever, connection between said T-lever and the valve, means to raise and lower the pivotal point of said T-lever as the piston begins and ends its stroke, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable and means to impart reciprocating movement to said slides, and manually-controlled means to reverse the pivotal position of said pivotally-movable member and to release the locked end of said T-lever from said pivotally-movable member and to engage the opposite end of said T-lever with said pivotally-movable member and to lock it thereto, substantially as described.

10. In a valve-gear, the combination with the valve, of a rod or bar, a cam on which said rod or bar is supported comprising end sections and an intermediate circular section, connection between said rod or bar and the engine cross-head whereby movement of said cross-head will impart movement to said rod or bar, a T-lever pivoted to said rod or bar, connection between said T-lever and the valve, a pivotally-movable member, means to alternately lock said T-lever to said pivotally-movable member at opposite sides of its point of pivotal support, and means to impart oscillatory movement to said pivotally-movable member, said means comprising cam-slides, guides on which said cam-slides are movable, and means to impart reciprocating movement to said slides, substantially as described.

11. In a valve-gear, the combination with the valve, of a rod or bar, a cam on which said rod or bar is supported, said cam comprising end sections and an intermediate circular section, connection between said rod or bar and the engine cross-head whereby movement of said cross-head will impart movement to said rod or bar, a T-lever pivoted upon said rod or bar, connection between said T-lever and the valve, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable, and connection between said cam-slides and the engine cross-head, whereby movement of said cross-head will impart reciprocating movement to said cam-slides, substantially as described.

12. In a valve-gear, the combination with the valve, of a rod or bar, a cam on which said rod or bar is supported comprising end sections and an intermediate circular section, connection between said rod or bar and the engine cross-head whereby movement of said cross-head will impart movement to said rod or bar, a T-lever pivoted upon said rod or bar connection between said T-lever and the valve, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable, connection between said cam-slides and the rod or bar to which said T-lever is pivoted, and means to vary the point of connection of said cam-slides to said rod or bar lengthwise of said rod or bar, substantially as described.

13. In a valve-gear, the combination with the valve, of a rod or bar, a cam on which said rod or bar is supported, said cam comprising end sections and an intermediate circular section, connection between said rod or bar and the engine cross-head whereby movement of said cross-head will impart movement to said rod or bar, a T-lever pivoted upon said rod or bar, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable, plates or rods secured to said cam-slides, and connection between said cam-slides and the rod or bar upon which said T-lever is pivoted, substantially as described.

14. In a valve-gear, the combination with the valve, of a rod or bar, a cam on which said rod or bar is supported, said cam comprising end sections and an intermediate circular section, connection between said rod or bar and the engine cross-head whereby movement of said cross-head will impart movement to said rod or bar, a T-lever pivoted upon said rod or bar, connection between said T-lever and the valve, a pivotally-movable member, means to alternately lock said T-lever to said pivotally-movable member at opposite sides of its point of pivotal support, means to impart oscillatory movement to said pivotally-movable member, said means comprising cam-slides, guides on which said cam-slides are movable, rods or plates secured to said cam-slides, which diverge from each other, a head or frame on the rod or bar to which said T-lever is pivoted, provided with bearings to which the diverging rods or plates secured to the cam-slides are fitted so as to be longitudinally movable, and manually-controlled means to vary the position of said head or frame longitudinally of said rod or bar, substantially as described.

15. In a valve-gear, the combination with the valve, of a rod or bar, a cam on which said rod or bar is supported, said cam comprising end sections and an intermediate circular section, connection between said rod or bar and the engine cross-head whereby movement of said cross-head will impart movement to said rod or bar, a T-lever pivoted upon said rod or bar, connection between said T-lever and the valve, a pivotally-movable member, means to alternately lock said T-lever to said pivotally-movable member at opposite sides of its pivotal point of support, means to impart oscillatory movement to said pivotally-movable member, said means comprising cam-slides, guides on which said cam-slides are movable, means to impart reciprocating movement to said cam-slides and to vary their longitudinal adjustment, said means comprising rods or plates secured to said cam-slides, connection between said rods or plates and the rod or bar on which said T-lever is pivoted and manually-controlled means to vary the point of connection of the rods or plates secured to the cam-slides to said rod or bar longitudinally of said rod or bar, the relation being such that in its extreme positions it will be parallel respectively with the rods or plates secured to different cam-slides, substantially as described.

16. In a valve-gear, the combination with the valve, of a rod or bar, a cam on which said rod or bar is supported, said cam comprising end sections and an intermediate circular section, connection between said rod or bar and the engine cross-head whereby movement of said cross-head will impart movement to said rod or bar, a T-lever pivoted upon said rod or bar, connection between said T-lever and the valve, a pivotally-movable member, means to alternately lock said T-lever to said pivotally-movable member at opposite sides of its point of pivotal support, and means to impart oscillatory movement to said pivotally-movable member, said means comprising cam-slides, diverging rods or bars secured to said cam-slides, a head or frame provided with bearings to which said diverging rods or plates are fitted so as to be longitudinally movable therein, a slide on the rod or bar to which said head or frame is pivoted, a fixed guide, a slide thereon movable in the direction of the length of the rods or plates secured to said cam-slides, connection between said slide and said head or frame comprising a flange on one thereof which engages a groove in the other, said flange and groove being parallel with the cross-head guides, and manually-controlled means to raise and lower said slide, the relation of parts being such that when in its extreme positions the rod or bar to which the said head or frame is connected, will be parallel respectively with the rod or bar connected to different cam-slides, substantially as described.

17. In a valve-gear, the combination with the valve, of a pivoted T-lever, connection between said T-lever and the valve, means to raise and lower the pivotal point of said T-lever as the piston begins and ends its stroke, a pivotally-movable member, a slide which runs in contact with said pivotally-movable member, reciprocating movement of which will operate to alternately lock said T-lever to said pivotally-movable member at opposite sides of its pivotal point, means to reciprocate said locking-slide and means to impart oscillatory movement to said pivotally-movable member, said means comprising cam-slides, guides on which said cam-slides are movable and means to reciprocate said cam-slides, substantially as described.

18. In a valve-gear, the combination with the valve, of a pivoted T-lever, connection between the T-lever and valve, means to raise and lower the pivotal point of said T-lever as the piston begins and ends its stroke, a pivotally-movable member, a slide which runs in contact with a surface of said pivotally-movable member, said slide being pivotally supported eccentric to the pivotal point of said pivotally-movable member, reciprocating movement of said slide relatively to said pivotally-movable member operating to alternately lock said T-lever to said pivotally-movable member at opposite sides of its point of pivotal support, means to reciprocate said locking-slide and means to impart oscillatory movement to said pivotally-movable member, comprising cam-slides, guides on which said cam-slides are movable, and means to reciprocate said cam-slides, substantially as described.

19. In a valve-gear, the combination with the valve, of a pivoted T-lever, connection between said T-lever and the valve, means to raise and lower the pivotal point of said T-lever as the piston begins and ends its stroke, a pivotally-movable member, a slide operating in contact with a surface of said pivotally-movable member, reciprocating movement of which will operate to lock said T-lever to said pivotally-movable member alternately on opposite sides of its point of pivotal support, means to impart reciprocating movement to said locking-slide, and means to impart oscillatory movement to said pivotally-movable member, said means comprising cam-slides, guides on which said cam-slides are movable, and means to impart reciprocating movement to said cam-slides, substantially as described.

20. In a valve-gear, the combination with the valve, of a pivoted T-lever, connection between said T-lever and the valve, means to raise and lower the pivotal point of said T-lever as the piston begins and ends its stroke, a pivotally-movable member, a slide operating in contact with a surface of said pivotally-movable member, reciprocating movement of which will operate to lock said T-lever to said pivotally-movable member alternately on opposite sides of its point of pivotal support, means to impart reciprocating movement to said locking-slide, means to impart oscillatory movement to said pivotally-movable member, said means comprising cam-slides, cam-surfaces on which operate in contact with bearing-surfaces on said locking-slide, guides on which said cam-slides are movable, and means to impart reciprocating movement to said cam-slides, substantially as described.

21. In a valve-gear, the combination with the valve, of a pivoted T-lever, connection between said T-lever and the valve, means to raise and lower the pivotal point of said T-lever as the piston begins and ends its stroke, a pivotally-movable member, a slide operating in contact with a surface of said pivotally-movable member and pivotally supported eccentrically to the pivotal point of said pivotally-movable member, reciprocating movement of said slide operating to lock said T-lever to said pivotally-movable member alternately on opposite sides of its point of pivotal support, means to impart reciprocating movement to said locking-slide, and means to impart oscillatory movement to said pivotally-movable member, said means comprising cam-slides, guides on which said cam-slides are movable and means to reciprocate said cam-slides, substantially as described.

22. In a valve-gear, the combination with the valve, of a pivoted T-lever, connection between said T-lever and the valve, means to raise and lower the pivotal point of said T-lever as the piston begins and ends its stroke, a pivotally-movable member, a slide operating in contact with a surface of said movable member and pivotally supported eccentrically to the pivotal point of said pivotally-movable member, reciprocating movement of said slide operating to lock said T-lever to said pivotally-movable member, alternately on opposite sides of its point of pivotal support, means to impart reciprocating movement to said locking-slide, and means to impart oscillatory movement to said pivotally-movable member, comprising cam-slides, cam-surfaces on which operate in contact with bearing-surfaces on said locking-slide, guides on which said cam-slides are movable, and means to impart reciprocating movement to said cam-slides, substantially as described.

23. In a valve-gear, the combination with the valve, of a pivoted T-lever, connection between said T-lever and the valve, means to raise and lower the pivotal point of said T-lever as the piston begins and ends its stroke, a pivotally-movable member, a slide operating in contact with a surface of said pivotally-movable member, reciprocating movement of which operates to lock said T-lever to said pivotally-movable member alternately on opposite sides of its point of pivotal support, means to impart reciprocating movement to said locking-slide, means to impart oscillatory movement to said pivotally-movable member, said means comprising cam-slides, cam-surfaces on which operate in contact with bearing-surfaces on said locking-slide, guides on which said cam-slides are movable and means to impart reciprocating movement to said cam-slides, and manually-controlled means for varying the longitudinal adjustment of said cam-slides relatively to each other, substantially as described.

24. In a valve-gear, the combination with the valve, of a pivoted T-lever, connection between said T-lever and the valve, means to raise and lower the pivotal point of said T-lever at the beginning and end of the piston-stroke, a pivotally-movable member, a slide operating in contact with a surface of said pivotally-movable member, reciprocating movement of which will operate to lock said T-lever to said pivotally-movable member alternately at opposite sides of its point of pivotal support, means to impart reciprocating movement to said locking-slide, means to impart oscillatory movement to said pivotally-movable member, said means comprising cam-slides, surfaces on which operate in contact with bearing-surfaces on said locking-slide, guides on which said cam-slides are movable, means to impart reciprocating movement to said cam-slides, and manually-controlled means for moving said locking-slide from any point of its movement in one direction to a corresponding point of its movement in the opposite direction, substantially as described.

25. In a valve gear, the combination with the valve, of a pivoted T-lever, connection between said T-lever and the valve, means to raise and lower the pivotal point of said T-lever as the piston begins and ends its stroke, a pivotally-movable member, a slide which operates in contact with a surface of said pivotally-movable member and is pivotally supported eccentrically to the pivotal point of said pivotally-movable member, reciprocating movement of said slide operating to lock said T-lever to said pivotally-movable member alternately on opposite sides of its point of pivotal support, a link, connection between the link-block and said locking-slide, means to raise and lower said link, means to impart oscillatory movement to said pivotally-movable member, said means comprising cam-slides cam-surfaces on which operate in contact with bearing-surfaces on said locking-slide, guides on which said cam-slides are movable, means to impart reciprocating movement to said cam-slides, and means to vary the longitudinal adjustment of said cam-slides relatively to each other, substantially as described.

26. In a valve-gear, the combination with the valve, of a pivoted T-lever, means to raise and lower the pivotal point of said T-lever as the piston begins and ends its stroke, a pivotally-movable member, a slide which operates in contact with a surface of said pivotally-movable member, reciprocating movement of which operates to lock said T-lever to said pivotally-movable member alternately at opposite sides of its point of pivotal support, means to impart reciprocating movement to said locking-slide, means to impart oscillatory movement to said pivotally-movable member, said means comprising cam-slides, cam-surfaces on which operate in contact with bearing-surfaces on said locking-slide, guides on which said cam-slides are movable, means to impart reciprocating movement to said cam-slides, manually-controlled means to move said locking-slide from any point of its movement in one direction to a corresponding point of its movement in the opposite direction, and cams on said slide, engagement of which with a rigid portion of which T-lever will operate to impart pivotal movement to said T-lever, substantially as described.

27. In a valve-gear, the combination with the valve, of a pivoted T-lever, connection between said T-lever and the valve, means to raise and lower the pivotal point of said T-lever as the piston begins and ends its stroke, a pivotally-movable member, a slide which operates in contact with a surface of said pivotally-movable member, reciprocating movement of which will operate to lock said T-lever to said pivotally-movable member alternately on opposite sides of its point of pivotal support, means to impart reciprocating movement to said locking-slide, means to impart oscillatory movement to said pivotally-movable member, said means comprising cam-slides, cam-surfaces on which operate in contact with bearing-surfaces on said locking-slide, guides on which said cam-slides are movable, and means to impart reciprocating movement to said cam-slides, manually-controlled means for moving said locking-slide from any point of its movement in one direction to a corresponding point of its movement in the opposite direction, and means controlled by the movement of said locking-slide in thus shifting its adjustment for releasing the locked end of said T-lever from said pivotally-movable member, and locking the opposite end thereto, substantially as described.

In testimony that I claim the foregoing as my invention I affix my signature, in presence of two subscribing witnesses, this 19th day of June, A. D. 1903.

FRANKLIN W. JARVIS.

Witnesses:
K. A. COSTELLO,
M. M. FURR.